United States Patent [19]
Smith

[11] 3,963,640
[45] June 15, 1976

[54] PROCESS OF PREPARING SODIUM-ALUMINUM SILICATE DISPERSION COMPLEX AND COMPOSITION

[75] Inventor: Fred Smith, Norwich, England

[73] Assignee: Anglian Water Authority, Norwich, England

[22] Filed: Feb. 14, 1975

[21] Appl. No.: 549,273

Related U.S. Application Data

[63] Continuation-in-part of Ser. No. 461,077, April 15, 1974, abandoned, which is a continuation-in-part of Ser. No. 262,865, June 14, 1972, abandoned.

[30] Foreign Application Priority Data

June 24, 1971 United Kingdom............... 29737/71
Mar. 23, 1972 United Kingdom............... 13644/72

[52] U.S. Cl............................. 252/313 R; 210/47; 210/49; 423/330
[51] Int. Cl.²......................................... B01J 13/00
[58] Field of Search............. 252/313 R; 210/42, 47, 210/49, 51; 423/328–330, 333

[56] References Cited
UNITED STATES PATENTS

| | | | |
|---|---|---|---|
| 2,310,009 | 2/1943 | Baker et al. | 210/51 |
| 2,999,734 | 9/1961 | Weber et al. | 423/330 |

*Primary Examiner*—Charles N. Hart
*Assistant Examiner*—Benoit Castel
*Attorney, Agent, or Firm*—Lawrence Rosen; E. Janet Berry

[57] ABSTRACT

A new complex alkali metal-aluminium-silicate material is made that is of particular value as a coagulant or coagulant aid in the removal of solids from aqueous suspensions. The complex material is completely soluble in hydrochloric acid. It is made by mixing with high shear an aqueous solution of alkali metal silicate and an aqueous solution of an aluminium salt in such proportions and under such conditions that a complex alkali metal-aluminium-silicate polymeric material is formed substantially immediately upon contact of the solutions and is rendered into a stable dispersion in water.

9 Claims, 1 Drawing Figure

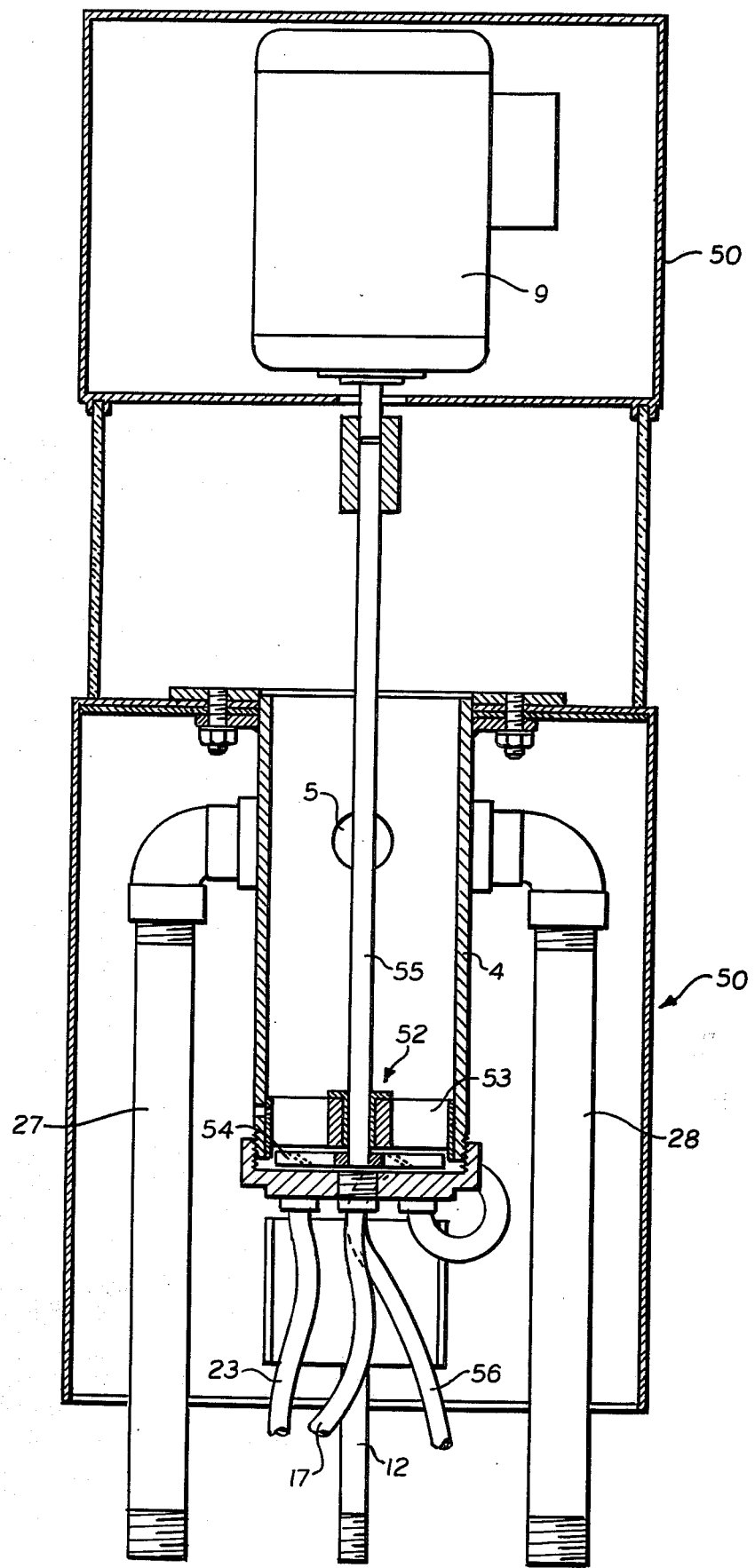

PROCESS OF PREPARING SODIUM-ALUMINUM SILICATE DISPERSION COMPLEX AND COMPOSITION

This Application is a continuation-in-part of my application Ser. No. 461,077 filed 15 Apr. 1974 which in turn is a continuation-in-part of my application Ser. No. 262,865, filed 14 June 1972, both now abandoned.

This invention relates to materials that can be used either alone or in combination with others to assist in the separation of suspended particles from an aqueous medium. Such agents can conveniently be called coagulants and coagulant aids.

It is already known to use material commonly referred to as "activated silica" as a coagulant aid. Activated silica is substantially wholly insoluble in acid and is generally made in situ by reducing the pH of a sodium silicate solution, for example by adding chlorine or sulphuric acid to it, and allowing the mixture to age for a time that is dependent upon the concentration. Although the sodium silicate is relatively cheap the apparatus required for mixing and ageing tends to be rather expensive and there is a considerable risk of the system gelling and silica precipitating out if ageing is allowed to continue for too long. It has also been proposed to activate sodium silicate by reducing its pH by adding aluminium sulphate to it, but again a similar mechanism seems to be involved. Thus the product is aged after mixing and is liable to gel and precipitate if it is aged for too long before use and the product still contains silica and is at least substantially wholly insoluble in hydrochloric acid.

One example of such a process is described in U.S. Pat. Spec. No. 2,310,009. Another process is described in more detail in British Specification No. 827,586. In this dilute aqueous solutions of aluminium sulphate and sodium silicate are mixed with thorough mixing and the mixture aged to produce a sol. It is stated that the final product is activated silica and that a suitable amount, measured as $SiO_2$, is from 0.8 to 1.2%. It is also stated that the pH of the product has to be between 5.5 and 8.5, with best values apparently being obtained at between pH 7 and 8.

In U.S. Pat. Spec. No. 2,999,734 a process is described in which a metal silicate is mixed with a metal aluminate and aluminium sulphate under condition such that a filterable precipitate is obtained. It appears that the precipitate is insoluble in hydrochloric acid.

It has been my object to make a product that does not form a precipitate, but is instead a stable dispersion, and that is soluble in hydrochloric acid.

According to the present invention there is made a new complex polymeric alkali metal-aluminium-silicate material that is completely soluble in hydrochloric acid.

The new material is made by mixing with high shear an aqueous solution of alkali metal silicate and aqueous solution of an aluminium salt in such proportions and under such conditions that a complex alkali metal aluminium silicate polymeric material is formed substantially immediately upon contact of the solutions and is rendered into a stable dispersion in water.

In practice the process is generally so carried out that the formation of the polymer and the formation of the stable dispersion of polymer in water occurs substantially simultaneously.

The process is usually carried out by introducing an aqueous solution of alkali metal silicate and an aqueous solution of aluminium salt to a vessel in which mixing with high shear of the solutions occurs. It is necessary that there should be a significant amount of water present during the mixing. All of the required amount of water can be introduced in the solutions of aluminium salt and alkali metal silicate, for instance by using a concentrated sodium silicate solution and a very dilute aluminium salt solution. Often, however an aqueous solution of alkali metal silicate, an aqueous solution of aluminium salt and a supply of water are introduced separately and mixed together with high shear in the mixing vessel.

In order that the desired product is obtained, and that substantially immediate formation and subsequent dispersion of complex material occurs, rather than the slow formation of active silica as in prior processes, it is necessary not only to have mixing with high shear but also the mix the silicate and aluminium salt in appropriate proportions and at appropriate pH and to select all the other process conditions, e.g. dilution and temperature and duration of the high shear, appropriately. In practice provided the proportions are chosen appropriately practically any convenient combination will be found to be satisfactory and so very little routine experiment is necessary to determine satisfactory process conditions. The process is normally operated at ambient temperature.

It is found in practice that an adequate indication of the proportions can be obtained in practice merely by observing the pH of the mixture.

The amount of water included in the product is such that the amount of silicate in the product, measured as $SiO_2$, is preferably from 0.5 to 5.0% by weight and we find that with such amounts the pH is preferably from 3 to 7.5.

It is also found desirable to observe a relationship between silicate content and pH such that at lower silicate contents the lower pH values are used and at higher silicate contents the higher values are used. There are set out in Table I suitable ranges of pH values for very good results, and in Table II the preferred pH value, at different silicate contents. Naturally satisfactory results can be obtained at values outside the ranges in Table I, provided the pH is from 3 to 7.5. Values for silica concentrations not quoted in the Tables can be obtained by interpolation.

TABLE I

| % silicate (as $SiO_2$) | pH range |
|---|---|
| 0.5 | 3–4.2 |
| 1.0 | 3–4.3 |
| 1.5 | 3.2–4.5 |
| 2.0 | 3.4–4.6 |
| 3.0 | 3.7–4.9 |
| 4.0 | 4.3–5.4 |
| 5.0 | 5.5–7.5 |

TABLE II

| % silicate (as $SiO_2$) | optimum pH |
|---|---|
| 0.5 | 3.6 |
| 1.0 | 3.7 |
| 1.5 | 3.8 |
| 2.0 | 4.0 |
| 3.0 | 4.3 |
| 4.0 | 4.9 |
| 5.0 | 6.5 |

It will be deduced from the Tables that at the values of 0.8 and 1.2% silica, in the invention the pH values are preferably below 4.5, whereas for these concentrations in specification Ser. No. 827,586 it is stated the pH values should be 5.5 to 8.5 and are preferably between 7 and 8, and by referring to FIG. 2 the pH is seen actually to be 9.5. If we so control the amounts of aluminium sulphate and sodium silicate that such high pH values are obtained at these concentrations of silica unsatisfactory results are obtained.

The aluminium salt is normally the sulphate. It does not have to be pure aluminium sulphate and it is satisfactory to use the commercially available material that is often contaminated with sulphuric acid, although neutral aluminium sulphate can be used. However it is naturally desirable that the material should not be too contaminated with acid. The aluminum sulphate is normally obtained as an aqueous solution of about 8% or in solid form, and in use is normally diluted or dissolved to a solution of 1 to 2 lbs per gallon with a pH of about 2.1 but of course other pH values can be used. Other aluminium salts, for example alums, can be used instead of aluminium sulphate. Aluminium nitrate can be used. This solution can be introduced into the mixing vessel as such when a separate stream of water is being fed to the mixer, or can be diluted with most at least, e.g. at least 90% by volume, of the water required in the mixer.

The amount of water fed to the mixer, by volume, is normally very large compared to the amount of sodium silicate and aluminium sulphate. For example the volume of water is normally at least 20 times the volume of sodium silicate, measured as a concentrated aqueous solution, and usually is at least 40 times the volume of this silicate solution. If insufficient water is present the product is more concentrated than is desired. This can make handling of the product more difficult and also can make control of the dosage of the product, as coagulant or coagulant aid, slightly more difficult to control. If too much water is present the product is so dilute that large volumes of it have to be added as coagulant or coagulant aid. Generally the volume of water is not more than 100 times the volume of the described concentrated sodium silicate solution, and is normally not more than 60 times, or at the most 80 times, the volume of the described sodium silicate solution. Usually most at least of the water is introduced to the mixing vessel in a stream separate from the streams of sodium silicate and aluminium sulphate, but instead one can use a concentrated sodium silicate solution and a very dilute aluminium sulphate solution, with no extra water.

The silicate is usually sodium silicate and normally is initially obtained as a concentrated aqueous solution that has a very high pH, for example 12 to 13. The mean weight ratio $SiO_2:Na_2O$ is preferably from 2.5 to 3.65, for example 3.30.

The amount of water used in the process is usually such that in the absence of the aluminium sulphate or other salt the pH of the diluted solution of sodium silicate would be below 11.6 and most preferably below 11.3. However it should not be below 10, and preferably it is from 10.8 and 11.3. Naturally the amount of water added to achieve these values will depend in part on the pH of the water supply. Other silicates than can be used instead of sodium silicate include potassium silicate.

It is essential that the solutions are vigorously mixed together with high shear both to ensure thorough mixing and the desired chemical reaction and to ensure the formation of a stable dispersion of the product. This dispersion can be considered to be a colloidal dispersion or emulsion.

The mixing chamber may simply be a cylindrical vessel and the high shear may be applied simply by rotating one or more blades in the vessel. There is no problem in determining whether the shear applied in any particular process is high enough since simple analysis of the product will show this. If the product is soluble in hydrochloric acid and is a stable polymeric emulsion or dispersion the shear is sufficiently high. If the product is not a stable polymeric emulsion or dispersion the shear is not high enough and any insolubility in acid of the product shows that it contains silica.

It is essential that mixing should be conducted only under high shear and thus the apparatus should be designed so that there is substantially no gradual mixing of the solutions before they are subjected to high shear. This can adequately be ensured by providing the means for mixing under high shear close to the inlets, e.g. close to the base of the mixing chamber when the inlets are in the base. For example the means for applying high shear are usually as close to the bottom of the vessel as is practicable, for example 0.5 to 5 millimeters above the inlets. In practice we have found that in the particular design of apparatus that we are using that mixing without shear is liable to occur if the means for mixing with high shear are positioned too far from the inlets. Naturally the distance from the inlets will depend to some extent at least upon the separation of the inlets. The distance should be less than 20 mm, preferably less than 10 mm, and most preferably not more than about 6 mm in the preferred apparatus.

Mixing with high shear is generally effected by rotor blades that rotate at high speed. It is necessary that adequate shear should be exerted close to the point of entry of the inlets into the chamber and so naturally it is desirable that the inlets should not be positioned axially but should be positioned some distance along the radii of the chamber. Preferably the inlets are positioned substantially uniformly around the base at a distance of from one-half to seven-eighths of the radius from the axis of the chamber.

The rotor blades should preferably extend out from the axis at least as far as the inlets and often slightly further. For example the rotor blades may have a diameter not less than two thirds of the diameter of the chamber.

The rotor blades should rotate at at least 500, and preferably at least 1,000 r.p.m., e.g. 1,000 – 5,000 r.p.m., most preferably 1,500 – 2,000 r.p.m. It may conveniently be stated that they should rotate at at least 500, and preferably 1,000, r.p.m. for each 2.5 cm of chamber diameter. Thus in a 10 cm chamber the blades may, for example, rotate at 2,000 to 4,000 r.p.m. In such a chamber a suitable range of speeds of rotation is 2,000 to 6,000 r.p.m.

It will be found in practice that very high speeds of rotation may be undesirable or impossible to obtain. For example cavitation may occur but it is possible to reduce the risk of this by appropriate design of the blades. Also it is impracticable to design apparatus in which the blades have to rotate at extremely fast speeds but this does not cause any serious limitation in the invention since in practice there is no advantage in having a chamber greater than, say, 20 centimeters in diameter and usually lesser diameters, for example 5 to 15 centimeters are adequate, and appropriate speeds of rotation for such chambers can easily be obtained.

Although adequate shear can be obtained using rotor blades especially at the lower (e.g. below 2 or 3%) concentration of $SiO_2$, shear can also be effected by an emulsifier unit positioned in the base of the vessel, close to the inlets. The emulsifier unit will include a stationary member and the design of the unit will be such that material coming from the inlets is mixed on being forced through a narrow aperture within the unit. Conveniently the emulsifier unit comprises the rotor blades described above and also stator blades. In such an apparatus it is usually desirable for the rotor blades to extend rather further across the diameter of the apparatus than indicated above, and indeed either or both of the rotor or stator blades may extend across substantially the entire diameter of the chamber. The stator or rotor blades, usually the stator blades, may be fixed substantially vertical or at a small angle to the vertical while the other blades may be fixed at a small angle to the horizontal. The small clearance between them may be, for example, 0.8 to 6 mm.

The process is usually carried out continuously with the ingredients being fed continuously to the chamber and the product being withdrawn continuously from the chamber. Although the product can be stored before use, since it is storage stable, it is usually used immediately upon its formation, and thus the product is preferably formed continuously, continuously withdrawn from the mixing chamber and continuously fed to its point of use. A convenient way of continuously withdrawing it from the reaction vessel is by means of a hydraulic ejector attached to the side of the reaction vessel at a point distant from the point of introduction of the reactants.

The product obtained by the process of the invention is soluble in hydrochloric acid and is free of silica and appears to be an alkali metal aluminium silicate. The product appears to be a novel compound but as it is colloidal it is difficult to characterise it accurately. It seems to have a high surface negative charge which suggests that the positively charged aluminium atoms are trapped within the lattice.

The product of the invention can be used for a wide variety of purposes. In particular, however, it is of value as a coagulant or coagulant aid in the removal of suspended solids of a wide variety of aqueous suspensions. For example it can be used in the purification of effluent from paper pulp treatment, it can be used in the purification of sewage and it can be used in the purification of municipal water supplies, the coagulated solids subsequently being removed by conventional methods. It is of particular value in the latter.

We find that when the coagulant is being used as a coagulant in an aqueous suspension to which a primary coagulant has already been added, for example aluminium sulphate, it is sufficient to add 1 to 2 parts per million of the product, measured as $SiO_2$. Generally the amount is about one tenth of the amount of primary coagulant dosage. For example if 40 ppm aluminium sulphate is used as primary coagulant we preferably use about 4 ppm of the product of the invention, measured as $SiO_2$. The product may, however, be used as the primary coagulant, no coagulant aid then being necessary.

A particular advantage of the product is that, provided the aluminium salt is aluminium sulphate, there is no statutory limitation on the amount of product that may be added to a municipal water supply since the atoms present in the product are already naturally present in the water supply.

Apparatus suitable for use in the invention is described in more detail in my application Ser. No. 262379, filed June 13, 1972, U.S. Pat. No. 3,881,704. Broadly it comprises a mixing chamber, means for applying high shear within the chamber, at least three separate inlets for liquids, and an outlet duct, at a position distant from the inlets and means for mixing the liquids under high shear.

The apparatus used in the invention is usually quite small, the mixing chamber having a diameter of only a few centimeters and having a volume below its outlet of 1 liter or less.

The reactants may be introduced at one end of the chamber and the outlet may be attached at the other end. Preferably the mixing chamber is vertical and the reactants are introduced at the base of the chamber and the outlet leads from the side of the chamber near its top. Preferably the outlet duct leads to a hydraulic ejector since this is a particularly convenient way of ensuring adequate flow of the product out of the chamber. The high pressure water supply required to operate the hydraulic ejector may be part of the water supply that is to be clarified when the product is being used as a coagulant or coagulant aid for water.

It will be appreciated that the process of the invention differs from known processes in a number of ways and as a result the product obtained in the invention is entirely different from the product obtainable previously.

For example, in the invention vigorous mixing with high shear is essential and, as explained above, this may involve the use of an impellor or rotor rotating at several thousand revolutions per minute and may even involve the use of something that can properly be called an emulsifier. Mixing methods used previously for the production of activated silica, even if described as being vigorous mixing methods, in practice have only involved agitation of the order of 30 revolutions per minute of an impeller.

Another example of the difference between our new process and the prior art is that in the process there is close control over the proportions of the reactants and over the pH, and also the pH and the proportions are chosen to suit the particular silicate content in the product. The pH is generally less than has been used previously.

Another example of the difference of the process of the invention for the processes of the prior art is that the product obtained in the invention is substantially completely soluble in hydrochloric acid and can be stored without precipitation occurring.

One form of apparatus for carrying out the invention is illustrated in the accompanying drawing, in vertical section, while other apparatus is illustrated also in my aforesaid application Ser. No. 262,379 U.S. Pat. No. 3,881,704. For instance apparatus not including a stator may be used, as illustrated in FIG. 3 of the aforesaid Application.

The apparatus shown comprises a case 50 in which is mounted a mixing chamber 4 and a motor 9. The mixing chamber 4 is an open cylindrical vessel having an outlet 5 near its top leading to a hydraulic ejector (not shown) having associated inlet pipe 27 for leading water to the hydraulic ejector and outlet pipe 28 for leading water and product from the mixing vessel away from the hydraulic ejector.

The chamber is provided with three separate inlets through and uniformly around its base and ducting leads to each inlet. The chamber may be 10 cm in diameter with the inlets arranged at 120° to each other each 3.5 cm from the axis of the chamber. Sodium silicate solution may be lead to the base of the chamber through ducting 17 while aluminium sulphate solution may be lead to the base of the chamber through ducting 23 and water may be lead to the base of the chamber through ducting 12 which enters the chamber at a position directly behind the point of entry of ducting 17 and is therefore not illustrated in the drawing. The ducting 12, 17 and 23 will lead from the water supply, sodium silicate supply and aluminium sulphate supply respectively through suitable metering and control devices by which the rate of flow of each component can be appropriately controlled.

An emulsifier unit 52 is fitted near the base of the chamber. This unit comprises stator blades 53 that are fixed to the sides of the chamber at an angle of 10° to 20° from vertical. Between the inlets to the chambers and the fixed stator blades are rotor blades 54 each extending 4.7 cm from the axis of the chamber and mounted on a rotatable shaft 55 very close, e.g. 1–2 mm, above the inlets. The rotor blades are at a small angle, for example 10° to 20°, to the horizontal and have a very small clearance from the stator blades 53. The clearance may be, for example, from 0.8 to 6 millimeters and is preferably about 1.5 millimeters. The rotor blades may rotate at for example from 1,000 or 2,000 to 5,000 R.P.M. and most preferably about 3,000 R.P.M. The optimum number of rotor blades and stator blades will be chosen having regard to various factors including the concentrations of the reactants that are to be passed through the emulsifier. Usually there will be six rotor blades and six stator blades but other numbers are suitable, for example three rotor blades and three stator blades, or the stator blades may be omitted.

There may be a tendency for the apparatus in which the product of the invention is made and through which it is transported, and in particular the mixing chamber, to become coated with the product, and if this does occur the apparatus can easily be cleaned simply by making the apparatus very acidic for a short period by passing an acid, usually a mineral acid such as hydrochloric acid, through the apparatus. It is not necessary to close down the supply of reactants since enough acid can easily be introduced into the reaction chamber in addition to the other reactants sufficiently quickly for a sufficient time, usually less than a minute and at the most a few minutes, to achieve necessary cleaning without unwanted precipitation occurring. Accordingly it is convenient to include in the apparatus means for supplying acid to the mixing chamber and in the apparatus illustrated such means is constituted by a fourth inlet to the centre of the base of the chamber to which ducting 56 leads direct from a suitable acid container through a suitable metering device. This metering device may include an electrically operated time clock so that cleansing occurs automatically at predetermined intervals, for example 1 to 10 times a day.

In a typical example concentrated sodium silicate solution having a specific gravity of 1.393 and a pH of 12.5 – 13.0 is delivered through ducting 17 at the rate of 18 gallons per day while aluminium sulphate solution having a concentration of 1–2 lbs per gallon and a pH of about 2.1 is delivered through ducting 23 at the rate of 50 gallons per day. Water having a hardness of 350 ppm and a pH of about 7.6 is supplied through ducting 12 at the rate of 35 gallons per hour. The volume of water is such that the pH of the combined liquid entering through ducting 12 and 17, in the absence of aluminium sulphate, would be between 10.8 and 11.3. The pH of the product leaving the mixing chamber 4 is 3.7. The silicate content, as $SiO_2$, is 1.0%. The stirrer 7 rotates at 3,000 r.p.m. The mixing chamber has a capacity of 1 liter.

Every six hours 300 cc of concentrated hydrochloric acid is introduced into the water supply through ducting 12 over a period of 27 seconds. Water is fed to the hydraulic ejector through pipe 27 at the rate of 500 gallons per hour.

The product is led from the outlet point 38 and dosed, at a rate of 4 ppm calculated as sodium silicate, to water that was intended for use as a municipal water supply and that has already been dosed with 40 ppm aluminium sulphate. After sedimentation and filtration the resultant water was after further treatment, such as chlorination, fit for use as municipal water.

Equally successful results are obtained when the product is used either in a vertical sludge blanket system or in a horizontal sedimentation system.

Using the process and apparatus described it is possible to obtain increased through-put and/or a saving in chemical treatment costs compared to known processes using activated silica. Also the apparatus is much smaller than has been required previously.

I claim:

1. A process in which a complex sodium aluminium silicate polymeric material that is completely soluble in hydrochloric acid and that is a stable dispersion in water is made by feeding an aqueous solution of sodium silicate and an aqueous solution of aluminium sulphate separately through separate inlets arranged around the base of a cylindrical chamber into the chamber, and rotating at a speed of about 1,000 to 5,000 r.p.m. rotor blades that are at least two-thirds the diameter of the chamber and that are mounted close to the base of the chamber not more than about 6 mm above the inlets, the proportions of sodium silicate and alumium sulphate and the total amount of water introduced into the chamber being such that in the product of the process the amount of silicate, measure as $SiO_2$, is 0.5 to 5% and the pH is from 3 to 7.5.

2. A process according to claim 1 in which the rotor blades rotate from about 0.8 to 6 mm beneath stator blades mounted in the chamber.

3. A process according to claim 1 in which the rotor blades are mounted at about 10° to 20° to the horizontal and are 0.5 to 5 mm above the inlets, and are about 0.8 to 6 mm beneath stator blades that are mounted at 10° to 20° to the vertical.

4. A process according to claim 1 in which the chamber has arranged around its base separate inlets for an aqueous solution of sodium silicate, for an aqueous solution of aluminium sulphate, and for a separate feed of water, and in which an aqueous solution of sodium silicate, an aqueous solution of aluminium sulphate and water are fed separately into the chamber through the said separate inlets.

5. A process according to claim 1 in which a complex sodium aluminium silicate polymeric material that is completely soluble in hydrochloric acid and that is a stable dispersion in water is made by feeding an aqueous solution of sodium silicate, an aqueous solution of aluminium sulphate and water separately through separate inlets arranged around the base of a cylindrical chamber into the chamber, and rotating at a speed of about 1,000 to 5,000 r.p.m. rotor blades that are at least two-thirds the diameter of the chamber and that are mounted at about 10° to 20° to the horizontal and that are 0.5 to 5 mm above the inlets and are about 0.8 to 6 mm beneath stator blades that are mounted at 10° to 20° to the vertical, the proportions of sodium silicate and aluminium sulphate and water being such that in the product of the process the amount of silicate, measured as $SiO_2$, is 0.5 to 5% and the pH is from 3 to 7.5.

6. A process according to claim 1 in which the silicate content and the pH are in accordance with the relationship shown in the following table:

| % silicate (as $SiO_2$) | pH range |
| --- | --- |
| 0.5 | 3–4.2 |
| 1.0 | 3–4.3 |
| 1.5 | 3.2–4.5 |
| 2.0 | 3.4–4.6 |
| 3.0 | 3.7–4.9 |
| 4.0 | 4.3–5.4 |
| 5.0 | 5.5–7.5 |

7. A process according to claim 1 in which the amount of water introduced into the chamber with the alkali metal silicate and aluminium salt aqueous solutions is such that the pH of the solution of the alkali metal silicate in the water, in the absence of the aluminium salt, would be from 10.8 to 11.6.

8. A process according to claim 1 in which deposits in the chamber are removed by passing acid through the chamber at intervals.

9. A stable water dispersion of a complex sodium aluminium silicate polymeric material containing an amount of silicate, measured as $SiO_2$, of from 0.5 to 5%, having a pH of from 3 to 7.5 and further characterised as being completely soluble in hydrochloric acid, said dispersion being prepared by the process of claim 1.

* * * * *